April 8, 1930.  D. I. REITER  1,753,218
SNAP FASTENER SOCKET
Filed July 12, 1928
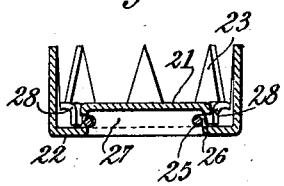
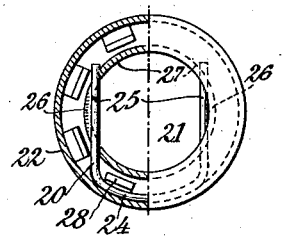
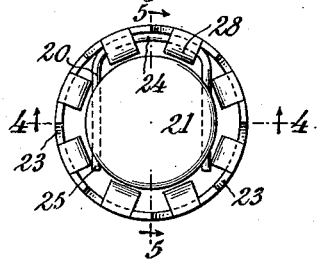
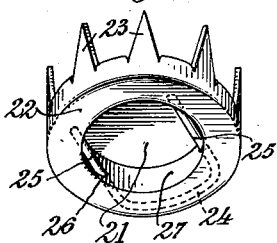
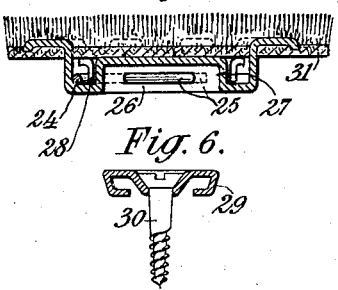
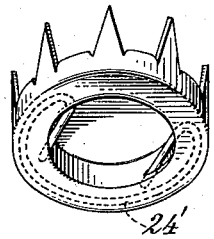
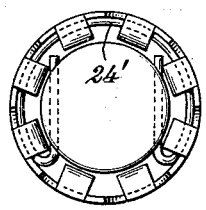
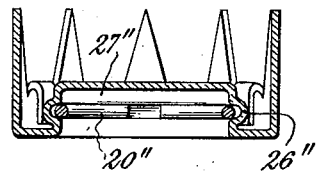
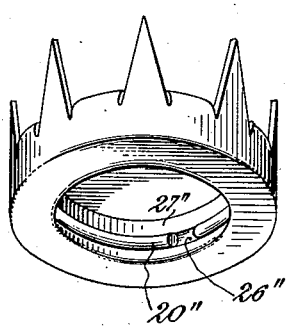
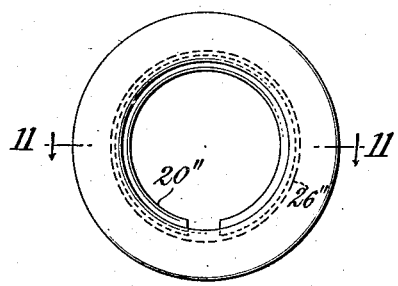
INVENTOR
Daniel I. Reiter,
By Attorneys,
Fraser, Myers & Manley Patented Apr. 8, 1930

1,753,218

UNITED STATES PATENT OFFICE

DANIEL I. REITER, OF NEW YORK, N. Y.

SNAP-FASTENER SOCKET

Application filed July 12, 1928. Serial No. 292,219.

This invention relates to an improved snap fastener socket adapted for general application but particularly useful as a part of a rug fastener or other fastener intended to be subjected to the exacting conditions of unusually heavy service.

It is an object of the invention to provide a socket comprising not more than two parts of which one made from a single piece of metal may include a closed cup-like portion adapted to serve as a sounding element, a number of spaced attaching prongs, a channeled portion which may serve as a housing for a part of a stud-engaging element, and a number of reinforcing fingers disposed in an alternate relation with respect to said prongs, one or more of which may be used as a part of the holding means for the stud-engaging element.

In the accompanying drawings illustrating various modified forms of snap fastener sockets embodying the invention,—

Figure 1 is a perspective view of a socket in which the invention is embodied in its preferred form.

Fig. 2 is a face view of the socket illustrated in Fig. 1, of which a part is shown in section.

Fig. 3 is a rear view of the same.

Fig. 4 is a view of the socket in cross-section along the line 4—4 of Fig. 3 viewed in the direction indicated by the arrows.

Fig. 5 is a view of the socket in cross-section along the line 5—5 of Fig. 3, the device being indicated as having been attached to a rug or other article to be secured by the fastener.

Fig. 6 is a conventional view of a stud adapted to be snapped into an engaging relation with the resilient stud-retaining element of the socket and yieldingly held thereby.

Fig. 7 is a perspective view of a socket embodying the invention in a modified form.

Fig. 8 is a rear view of the socket illustrated in Fig. 7.

Fig. 9 is a perspective view of a second modified form of the invention.

Fig. 10 is a face view of the socket illustrated in Fig. 9.

Fig. 11 is a view of the socket in cross-section along the line 11—11 of Fig. 10 viewed in the direction indicated by the arrows.

Referring first to Figs. 1 to 6, inclusive, the invention is illustrated as embodied in a snap fastener socket which in its preferred form comprises a resilient stud-engaging wire or spring 20 and a holding and attaching device which may be made from a single disk of metal and which may include a closed cup-like portion 21, a surrounding channeled portion 22 and a number of marginal attaching prongs 23 extending in spaced relation from the outer wall of the channel.

As best indicated in Figs. 1, 2 and 3, the stud-engaging spring may be in the form of a U shaped resilient wire having a curved portion 24 partially housed in a portion of the channel 22 and having end portions 25 sprung into engagement with slotted portions 26 of the circumferential wall 27 of the cup-like portion 21.

If desired, the outer wall of the channel 22 may be reinforced or stiffened by means of fingers 28, which may comprise parts of the disk from which the device is made, bent inwardly and downwardly close to the base of the channel. Such fingers may be disposed in alternate relation with respect to the prongs 23, and one or more of them may be bent snugly over the curved portion 24 of the stud-engaging wire 20 and serve as retaining means therefor.

The stud 29 diagrammatically indicated in Fig. 6 may be secured to the floor by means of a screw 30, and a rug or other floor covering 31 may be held in place by applying the socket to the stud so as to cause the latter to be snapped into an engaging relation with the ends 25 of the stud-retaining wire 20.

It will be obvious that the socket may be used as a part of a snap fastener the stud element of which may be adapted to be secured to a piece of leather, fabric or other sheet material, by means of spurs or other appropriate attaching means.

In designing the above-described fastener, each part has been so positioned as to best serve its intended function. The prongs are well separated, thereby providing means whereby the socket may be firmly secured to the article on which it is intended to be used. Portions of the metal lying between the prongs have been made use of in the reinforcement of the marginal portion of the socket. The central portion of the disk is made use of as a sounding element adapted to produce a resonant click or snap as the stud is forced into its engaging relation with the stud-retaining spring 20. The spring is mounted in a contacting relationship with the walls of the cup-like portion of which the sounding element forms a part, so that the vibration of the spring, when the stud is inserted, will be directly communicated to the sounding element. The closed top of the sounding element serves as a thumb-piece when applying the socket to the stud and prevents the soft material to which the socket may be secured from being forced into the stud-receiving recess and deadening the sound produced when the spring is snapped into its engaging relation with the stud. This is a matter of some considerable importance since customers frequently regard a snap fastener as being infiecient or defective if a sharp snap or click is not produced when the stud and socket are forced into engagement with each other.

In Figs. 7 and 8 is illustrated a modified form of the invention, which differs from that illustrated in Figs. 1 to 6, inclusive, only in that the curved portion of the stud-engaging spring connecting the end portions 25 is carried the long way around the channel as indicated at 24', instead of being connected more directly so as to form the U shaped type of spring illustrated in Fig. 3.

In the modified form of the invention illustrated in Figs. 9 to 11, inclusive, the circumferential wall 27'' of the cup-like portion of the socket is bent outwardly as at 26'' to provide a groove into which the stud-engaging wire or spring in the form of a split ring 20'' may be sprung and held. The groove in the bent portion 26'' may be of a slightly larger diameter than the normal diameter of the ring so as to provide for a slight expansion of the ring when the stud is inserted.

Other features of the modified forms of the invention illustrated in Figs. 7 to 11, inclusive, correspond with those of the preferred form and need not be specifically referred to.

The invention is not intended to be limited to the forms herein disclosed for purposes of illustration but should be regarded as covering modifications and variations thereof within the scope of the appended claim.

What is claimed is:

A snap fastener socket comprising a resilient stud-engaging wire, and a holder and attaching element therefor consisting of a single piece of metal having a closed, flat-bottomed central, cup-like portion of relatively large diameter to serve as a thumb-piece, support, and sounding device, pointed marginal prongs spaced in a circular series about said cup-like portion to serve as attaching means, and inturned prongs alternating with certain of said attaching prongs to serve as a part of the means whereby the stud-engaging wire is retained in the holder and attaching element.

In witness whereof, I have hereunto signed my name.

DANIEL I. REITER.